United States Patent
Wan et al.

(10) Patent No.: US 11,558,207 B2
(45) Date of Patent: Jan. 17, 2023

(54) METHOD AND APPARATUS FOR STARTING UP BLOCKCHAIN SYSTEM, AND NON-TRANSITORY COMPUTER-READABLE STORAGE MEDIUM

(71) Applicant: Beijing Baidu Netcom Science Technology Co., Ltd., Beijing (CN)

(72) Inventors: Chunhui Wan, Beijing (CN); Zhimin Wei, Beijing (CN); Tong Jin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/750,699

(22) Filed: May 23, 2022

(65) Prior Publication Data

US 2022/0400018 A1 Dec. 15, 2022

(30) Foreign Application Priority Data

Jun. 11, 2021 (CN) .......................... 202110652665.0

(51) Int. Cl.
*H04L 9/00* (2022.01)
*G06F 9/54* (2006.01)
*G06F 9/445* (2018.01)

(52) U.S. Cl.
CPC ............ *H04L 9/50* (2022.05); *G06F 9/44505* (2013.01); *G06F 9/547* (2013.01)

(58) Field of Classification Search
CPC ......... H04L 9/50; G06F 9/44505; G06F 9/547
See application file for complete search history.

(56) References Cited

U.S. PATENT DOCUMENTS 10,873,456 B1 * 12/2020 Dods .................. G06N 20/00
11,081,219 B1 * 8/2021 Dods .................. G06N 3/0454
(Continued)

FOREIGN PATENT DOCUMENTS

CN 109800056 A 5/2019
CN 110222109 A 9/2019
(Continued)

OTHER PUBLICATIONS

First Search Report for Chinese Patent Application No. 202110652665.0 dated Jul. 20, 2021.
(Continued)

*Primary Examiner* — Taghi T Arani
*Assistant Examiner* — Blake I Narramore
(74) *Attorney, Agent, or Firm* — KDB Firm PLLC

(57) ABSTRACT

Provided are a method and apparatus for starting up a blockchain system and a non-transitory computer-readable a storage medium. The method includes operating a main program of a blockchain system to initialize a kernel engine and a kernel component, wherein the main program of the blockchain system comprises an initialization method of the kernel engine and an initialization method of at least one kernel component; obtaining operation configuration information of the blockchain system through a program configuration file to instantiate the kernel engine and the kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system.

20 Claims, 8 Drawing Sheets

(56) References Cited

U.S. PATENT DOCUMENTS

| | | | | |
|---|---|---|---|---|
| 2017/0228371 | A1* | 8/2017 | Seger, II | G06F 16/2255 |
| 2020/0028691 | A1* | 1/2020 | Rao | G06F 8/658 |
| 2021/0314172 | A1* | 10/2021 | Tom | H04L 9/3268 |
| 2021/0342329 | A1* | 11/2021 | Padmanabhan | G06F 16/28 |

FOREIGN PATENT DOCUMENTS

| | | |
|---|---|---|
| CN | 111736909 A | 10/2020 |
| CN | 112256388 A | 1/2021 |

OTHER PUBLICATIONS

First Office Action for Chinese Patent Application No. 202110652665.0 dated Jul. 20, 2021.

Second Office Action for Chinese Patent Application No. 202110652665.0 dated Aug. 25, 2021.

Notice of Reasons for Refusal dated Aug. 25, 2022, for Japanese Patent Application No. 2022-083552 (six (6) pages).

Song et al., "Research advances on blockchain-as-a-service: architectures, applications and challenges", e:archives, applications and challenges, Science Direct, www.sciencedirect.com/science/article/pii/S2352864821000092.

* cited by examiner

METHOD AND APPARATUS FOR STARTING UP BLOCKCHAIN SYSTEM, AND NON-TRANSITORY COMPUTER-READABLE STORAGE MEDIUM

CROSS-REFERENCE TO RELATED APPLICATION(S)

This application claims priority to Chinese Patent Application No. 202110652665.0 filed with the China National Intellectual Property Administration (CNIPA) on Jun. 11, 2021, the disclosure of which is incorporated herein by reference in its entirety.

TECHNICAL FIELD

The present disclosure relates to the field of computer technologies and, in particular, the blockchain technology.

BACKGROUND

The blockchain industry continues to develop rapidly, and main application scenarios of the blockchain technology in the early stages of development are digital currencies and games. At present, the blockchain technology has entered a new stage of comprehensively exploring enabling the industry from serving as the underlying technology that supports the digital currencies.

At present, the mainstream solutions for blockchain basically correspond to specific application scenarios. Most of the conventional solutions are oriented to application scenarios of the digital currencies and thus more suitable for applications of the digital currencies. Therefore, in actual business scenarios, the conventional solutions will encounter problems in applicability, and thus the in-depth reconstruction of the framework is required; however, both the costs and technical thresholds of the reconstruction are very high.

The manner of in-depth reconstruction on the framework is difficult and costly, and after the reconstruction, the latest update corresponding to the framework cannot be automatically followed up.

SUMMARY

The present disclosure provides a method and apparatus for starting up a blockchain system, and a non-transitory computer-readable storage medium.

According to an embodiment of the present application, a method for starting up a blockchain system is provided. The method includes the following steps: operating a main program of a blockchain system to initialize a kernel engine and a kernel component, where the main program of the blockchain system comprises an initialization method of the kernel engine and an initialization method of at least one kernel component; obtaining operation configuration information of the blockchain system through a program configuration file to instantiate the kernel engine and the kernel component, where the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, where the port monitoring service refers to a service in which an application layer interaction port for interacting between the kernel engine and an application layer is monitored, and the kernel engine is configured to call, in a process of processing blockchain data, the at least one kernel component based on a kernel component interface; where operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and where operating the main program of the blockchain system to initialize the kernel component comprises: operating an initialization method of the kernel component in the main program of the blockchain system; and in a process of operating the initialization method of the kernel component, calling an adapter registration interface in a kernel framework to register a component driver of the kernel component in a component adapter.

According to another embodiment of the present application, an electronic device is provided. The electronic device includes at least one processor; and a memory communicatively connected to the at least one processor; where the memory is configured to store an instruction executable by the at least one processor to cause the at least one processor to perform: operating a main program of a blockchain system to initialize a kernel engine and a kernel component, wherein the main program of the blockchain system comprises an initialization method of the kernel engine and an initialization method of at least one kernel component; obtaining operation configuration information of the blockchain system through a program configuration file to instantiate the kernel engine and the kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, where the port monitoring service refers to a service in which an application layer interaction port for interacting between the kernel engine and an application layer is monitored, and the kernel engine is configured to call, in a process of processing blockchain data, the at least one kernel component based on a kernel component interface; where operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and where operating the main program of the blockchain system to initialize the kernel component comprises: operating an initialization method of the kernel component in the main program of the blockchain system; and in a process of operating the initialization method of the kernel component, calling an adapter registration interface in a kernel framework to register a component driver of the kernel component in a component adapter.

According to an embodiment of the present application, a non-transitory computer-readable storage medium is provided. The non-transitory computer-readable storage medium is configured to store a computer instruction, where the computer instruction is configured to cause a computer to perform: operating a main program of a blockchain system to initialize a kernel engine and a kernel component, wherein the main program of the blockchain system comprises an initialization method of the kernel engine and an initialization method of at least one kernel component; obtaining operation configuration information of the blockchain system through a program configuration file to instantiate the kernel engine and the kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, where the port monitoring service refers to a service in which an application layer interaction port for interacting between the kernel engine and an application layer is monitored, and the kernel engine is configured to call, in a process of processing blockchain data, the at least one kernel component based on a kernel component interface; where operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and where operating the main program of the blockchain system to initialize the kernel component comprises: operating an initialization method of the kernel component in the main program of the blockchain system; and in a process of operating the initialization method of the kernel component, calling an adapter registration interface in a kernel framework to register a component driver of the kernel component in a component adapter.

It is to be understood that the content described in this part is neither intended to identify key or important features of the embodiments of the present application nor intended to limit the scope of the present application. Other features of the present application are apparent from the description provided hereinafter.

BRIEF DESCRIPTION OF DRAWINGS

The drawings are intended to provide a better understanding of the present solution and not to limit the present application.

DETAILED DESCRIPTION

Figure 1:
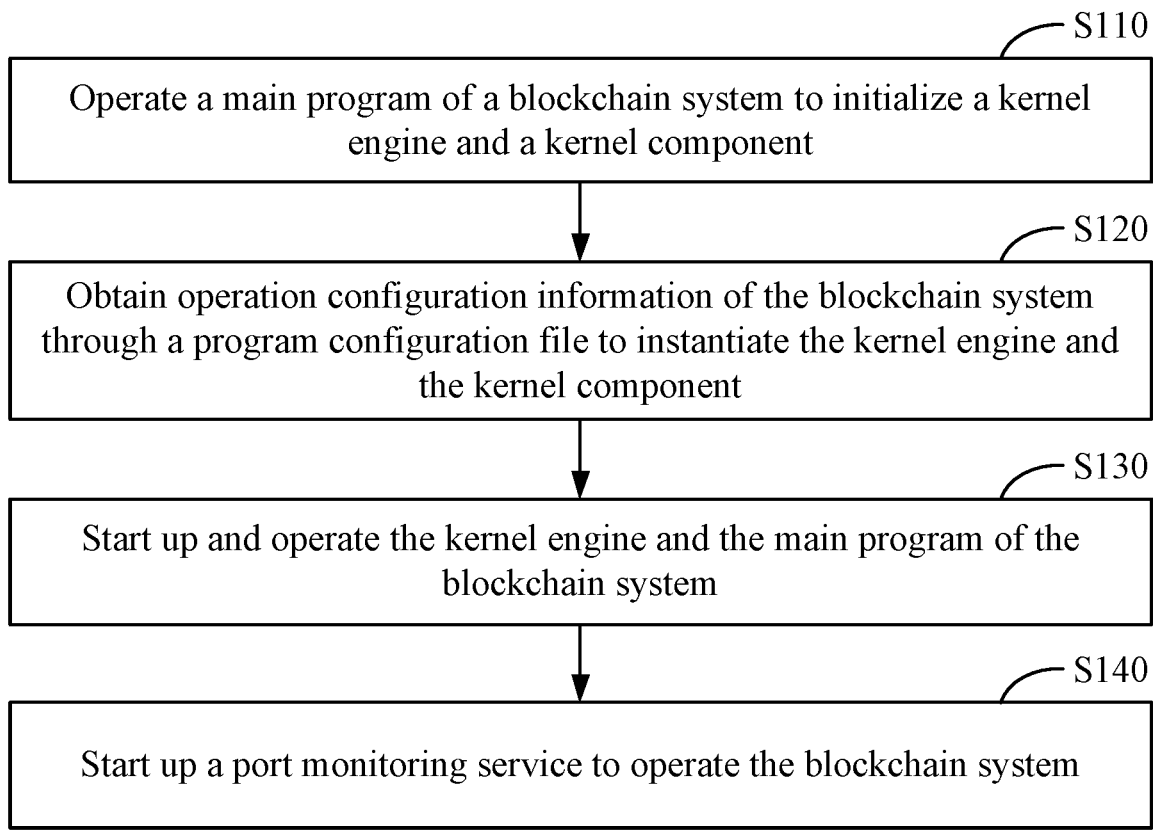
FIG. 1 is a schematic diagram of a method for starting up a blockchain system according to an embodiment of the present application.

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

The method for starting up a blockchain system provided in the embodiments of the present application is provided on the basis of a blockchain kernel architecture constructed by the inventor.

A blockchain system as a whole may be divided into two parts, that is, a blockchain kernel architecture and a blockchain application layer, respectively. The blockchain application layer is for users to implement specific business requirements based on the blockchain system, and the blockchain application layer shields the users from the complex blockchain underlying technology so that a blockchain may be built to satisfy the business requirements as long as the users understand basic principles of the blockchain. A server function of the blockchain application layer may be implemented by a main program of the blockchain system. The blockchain application layer may further include a client and an application programming interface (API) to provide a user interaction interface or interaction mechanism, to achieve interaction with the users. In a blockchain system, business functions of one or more blockchain application layers may be supported. The client or API of the application layer may interact with the blockchain kernel architecture through a proprietary component, where the proprietary component, for example, implements a monitoring service for a set interaction port.

The present application pays more attention to the blockchain kernel architecture, where the kernel architecture includes at least a kernel engine layer and a kernel component layer and may further include a basic component layer. The kernel engine layer defines core flows of the blockchain kernel, that is, core flows of various types of business logic in an operation process of the blockchain, such as a transaction processing flow, a miner block generation flow, and a block synchronization flow. In the embodiments of the present application, the so-called transaction is a transaction request that is initiated by a blockchain user and needs to be processed by a blockchain node based on the blockchain system, in which a processing process is stored on chain.

The transaction is not limited to a transaction business and may be any application business required to be carried by the blockchain or any blockchain management transaction request. The so-called miner is a blockchain node that has a permission to generate blocks in a current block generation period and is not limited to a block generation node determined based on a proof of work (POW) consensus mechanism. Block generation nodes determined based on other consensus mechanisms may also be referred to as miners. In addition, a kernel engine uses a read/write separating design to reduce complexity and may use an independent-read component to implement a read operation, enabling the read operation to be individually expanded. The kernel engine in the kernel engine layer may be expanded and customized without invasion of framework codes or may be adjusted and customized based on lightweight codes by the users according to scenario requirements. That is, a developer may develop the kernel engine based on a function of a kernel component, without the need to develop the kernel component separately. Based on the kernel architecture, a possibility of configuring multiple types of kernel engine layers is provided for the users, and specifically, a super public chain engine (xuperos engine), a super alliance chain engine (xchain engine), a user-implemented kernel engine (other engines) and the like may be configured and developed.

The kernel component layer is a specific implementation of a kernel component programming specification with an implementation of very complete built-in standard kernel components, including a ledger component, a consensus component, a contract component, a network component, an encryption component, a permission component and the like for the developer of the kernel engine to select. At the same time, the developer may develop kernel components suitable for a scenario of the developer according to the kernel component programming specification at low cost and seamlessly integrate the self-implemented kernel components into various kernel engines. The kernel component programming specification is a specification for abstracting kernel components. The kernel components are implemented according to the kernel component programming specification so that a standard kernel component function interface may be provided for the kernel engine to call the kernel components, and thus the kernel engine may call the kernel components through a kernel component interface determined by a component adaptor (such as a consensus component adaptor, a contract component adaptor, a ledger component adaptor, a network component adaptor, or a permission component adaptor) in the kernel engine layer and then complete the processing of to-be-processed blockchain data through the kernel components. The kernel component interface may also be referred to as a kernel function interface, which is a function-level interface that the kernel components provide for the kernel engine to call. No matter which type of kernel component it is, no matter how the component function is implemented internally, a normalized and unified kernel component interface may be provided to facilitate the call by the kernel engine.

The basic component layer is provided with basic public components that are not related to a blockchain business, such as a basic storage, a peer-to-peer (P2P) network library, a cryptography library, a codec library, and a log library.

The blockchain kernel architecture provided in the present application is a brand-new, highly expandable and universal blockchain kernel framework applicable to wide-area scenarios. A highly-modular design of this architecture ensures the loose coupling between modules so that each module may be freely expanded and replaced. Based on this architecture, the users can develop a specific blockchain system with a very light weight according to requirements and preferences of a specific scenario. According to this architecture, the difficulty of developing the blockchain system is reduced so that part subdomain functions are expanded only according to scenario requirements and thus the research and development costs of the blockchain technology can be greatly reduced.

FIG. 1 is a schematic diagram of a method for starting up a blockchain system according to an embodiment of the present application. This embodiment may be applied to a case where after the development of a blockchain system program is completed, the initialization and operation are performed by starting up and operating the blockchain system program, and startup may be performed in a test process or a startup process is performed when the blockchain system program is deployed to an actual blockchain node. The method for starting up a blockchain system provided in this embodiment may be executed by an apparatus for starting up a blockchain system. The apparatus may be implemented by software and/or hardware and configured in an electronic device having calculation and storage functions, for example, may be configured in a blockchain node.

Referring to FIG. 1, the method for starting up a blockchain system provided in this embodiment includes the steps described below.

In S110, a main program of a blockchain system is operated to initialize a kernel engine and a kernel component.

The main program of the blockchain system includes an initialization method, a startup interface, and an exit interface of the kernel engine, the main program of the blockchain system further includes an initialization method of at least one kernel component, and the kernel engine is configured to call at least one kernel component based on a kernel component interface in a process of processing blockchain data.

The main program of the blockchain system is a code configured to execute an application layer business function in the blockchain system, and the main program is related to a specific business requirement. By way of example, business requirements may be various business requirements such as a transaction submission requirement or an electronic deposit requirement. In an embodiment, the main program of the blockchain system may be generated based on a main program code template pre-configured in a blockchain development software or may be customized and developed by the developer based on the kernel framework. The main program code template refers to a code template used for generating the main program, and the main program code template is a common code template pre-configured in a kernel framework code package by relevant technical personnel. At least one main program code template is provided. Generally, multiple main program templates are provided. To satisfy various business requirements of the users, the main program templates can cover various common business scenarios.

Specifically, in a program development stage, the blockchain developer enters blockchain development parameters through an interaction interface of the blockchain development software, and the blockchain development software automatically generates the main program of the blockchain system according to the blockchain development parameters and the main program code templates. Of course, it can be known that a method for generating the main program of the blockchain system is not limited to this, and the method for generating the main program of the blockchain system is not limited herein and determined according to an actual situation.

The main program of the blockchain system includes the initialization method, the startup interface, and the exit interface of the kernel engine, and the main program of the blockchain system further includes the initialization method of at least one kernel component.

The initialization method of the kernel engine refers to a method program entry for initializing the kernel engine, and the initialization method of the kernel component is a method program entry for initializing the kernel component. The startup interface of the kernel engine and the exit interface of the kernel engine are interfaces provided by the main program of the blockchain system for the application layer to control the kernel engine. Specifically, in the case where the blockchain system is started up, the application layer may start up the kernel engine by executing a kernel engine startup method through a kernel engine startup interface; and in the case of an abnormal blockchain system, the application layer may exit the kernel engine by executing a kernel engine exit method through a kernel engine exit interface. Of course, interfaces that are provided by the kernel framework for the main program and are capable of controlling the kernel engine are not limited to this and may further include other control function interfaces.

The kernel engine and the kernel component are initialized by the initialization method of the kernel engine and the initialization method of the kernel component in the main program of the blockchain system. The step in which the kernel engine and the kernel component are initialized includes registration processes of the kernel engine and the kernel component and instantiation processes of the kernel engine and the kernel component.

First, the kernel engine and the kernel component are registered separately. Specifically, the kernel engine is registered to an engine factory, and the kernel component is registered to a corresponding component adapter. In the embodiment of the present application, the kernel engine and the kernel component are managed through a factory mode since different business application scenarios have different requirements for the kernel engine and the kernel component. When the main program of the blockchain system is operated, a creation program of the kernel engine required by a user is registered in the kernel engine factory and the corresponding component adapter so that the user can perform a technical specification selection on the kernel engine and the kernel component as needed.

One or more kernel engines may be registered in the kernel engine factory, and multiple kernel engines may be registered in the kernel engine factory so that the user can select a corresponding kernel engine as needed.

The kernel component is the encapsulation of a method with a specific data processing function and may be divided according to an achievable function of the kernel component. The kernel component includes at least one of the following: a consensus component, a network component, a ledger component, a contract component, or a permission component. The consensus component is responsible for reaching a consensus of multi-node decentralization in a blockchain network and configured to execute a consensus mechanism between blockchain nodes; the network component is configured to execute a data transmission function in the blockchain network; the ledger component is configured to process ledger data based on a blockchain ledger rule; the contract component is configured to execute a smart contract to process a transaction request; and the permission component is configured to control a permission to call the smart contract.

In an embodiment, in the blockchain system of the embodiment of the present application, the kernel component may have a corresponding component adaptor. By way of example, the component adaptor may include a consensus component adaptor corresponding to the consensus component, a contract component adaptor corresponding to the contract component, a network component adaptor corresponding to the network component, and a permission component adaptor corresponding to the permission component. Some components may also be provided with no component adaptor according to the situation. For example, if the ledger component may be blockchain ledger data in the same storage format as the kernel engine, then a component interface provided by the ledger component for the kernel engine is an abstract interface for the blockchain ledger data.

The kernel component is registered to the corresponding component adapter. Specifically, at least one consensus component is registered to the consensus component adapter, at least one contract component is registered to the contract component adapter, at least one network component is registered to the network component adapter, and at least one permission component is registered to the corresponding permission component adapter.

In S120, operation configuration information of the blockchain system is obtained through a program configuration file to instantiate the kernel engine and the kernel component.

The program configuration file may be inputted by the developer through the blockchain development software and include the operation configuration information of the blockchain system, where the operation configuration information of the blockchain system is used for instantiating the kernel engine and the kernel component. In an embodiment, the operation configuration information of the blockchain system may include configuration information of the kernel engine and configuration information of the kernel component.

By way of example, the configuration information of the kernel engine may include specification selection information of the kernel engine, a block broadcast manner, a cache validity period, and a synchronization block queue size. The block broadcast manner defines a manner in which a node of the blockchain system transmits blockchain data to other block nodes in the blockchain system except for a native node. The cache validity period defines a retention period of local cache data of a blockchain node. The synchronization block queue size defines the number of blocks that can be synchronized at one time. The configuration information of the kernel component may include specification selection information of the kernel component.

The kernel engine and the kernel component are instantiated using the operation configuration information of the blockchain system. Specifically, basic parameters corresponding to the kernel engine and the kernel component are assigned according to the operation configuration information of the blockchain system.

In S130, the kernel engine and the main program of the blockchain system are started up and operated.

The main program of the blockchain system is started up and operated, to-be-processed blockchain data is processed through the blockchain system, the application layer business function in the blockchain system is executed, and an application layer business requirement is completed. Specifically, the kernel engine and the main program of the blockchain system are started up and operated, the kernel engine is called through the main program of the blockchain system, and the to-be-processed blockchain data is processed through the kernel engine.

The kernel engine is core flows of the blockchain kernel and configured to execute core operations of the blockchain. The kernel engine has a capability of calling kernel components. The process of processing the to-be-processed blockchain data by the kernel engine is actually a process in which the kernel engine calls the kernel component according to processing flows of the to-be-processed blockchain data, and the kernel engine and the kernel component cooperate with each other to process the to-be-processed blockchain data. The to-be-processed blockchain data includes at least one of a to-be-processed blockchain transaction request, a to-be-verified block, a to-be-synchronized block, or blockchain system maintenance data.

In an embodiment, the kernel component is started up while the kernel engine is started up, and resources required by the kernel component are allocated in advance for the kernel component and are to be used when the kernel component is called, thereby shortening the response delay of the blockchain system.

In S140, a port monitoring service is started up to operate the blockchain system.

The port monitoring service refers to a service in which an application layer interaction port for interacting between the kernel engine and the application layer is monitored. The application layer interaction port refers to a port through which the application layer interacts with the kernel engine. At least one application layer interaction port is provided, and generally multiple application layer interaction ports are provided. An application layer client transmits a pending request to the kernel engine through the application layer interaction port, such as requesting to process blockchain data. By way of example, the port monitoring service is a remote procedure call (RPC) service. In the case where the port monitoring service monitors that to-be-processed blockchain data exists at the application layer interaction port, a processor process of the kernel engine for the to-be-processed blockchain data is triggered.

In the technical scheme in the embodiment of the present application, a startup process of the blockchain system is achieved by operating the main program of the blockchain system. In the embodiment of the present application, in the startup process of the blockchain system, the kernel engine is registered to the engine factory, the kernel component is registered to the corresponding component adapter, and the kernel engine and the kernel component are instantiated according to the operation configuration information of the blockchain system so that the technical specification selections of the kernel component and the kernel engine in the case of no code invasion for the kernel component are achieved, a modular design of the kernel engine and the kernel component is achieved, and the scenario applicability of the blockchain system is expanded. According to the method for starting up a blockchain system provided in the present application, the difficulty of developing the blockchain system is reduced so that the user only needs to expand functions of the kernel component or the kernel engine according to scenario requirements and thus the research and development costs of the blockchain technology can be greatly reduced.

According to the technical scheme of the embodiment of the present application, the scalability and applicability of the implementation scheme for the blockchain can be improved, and the business scenarios to which the blockchain system is applied can be switched by performing reconstruction on the blockchain system without code invasion so that the research and development costs of the blockchain technology can be reduced.

Figure 2:
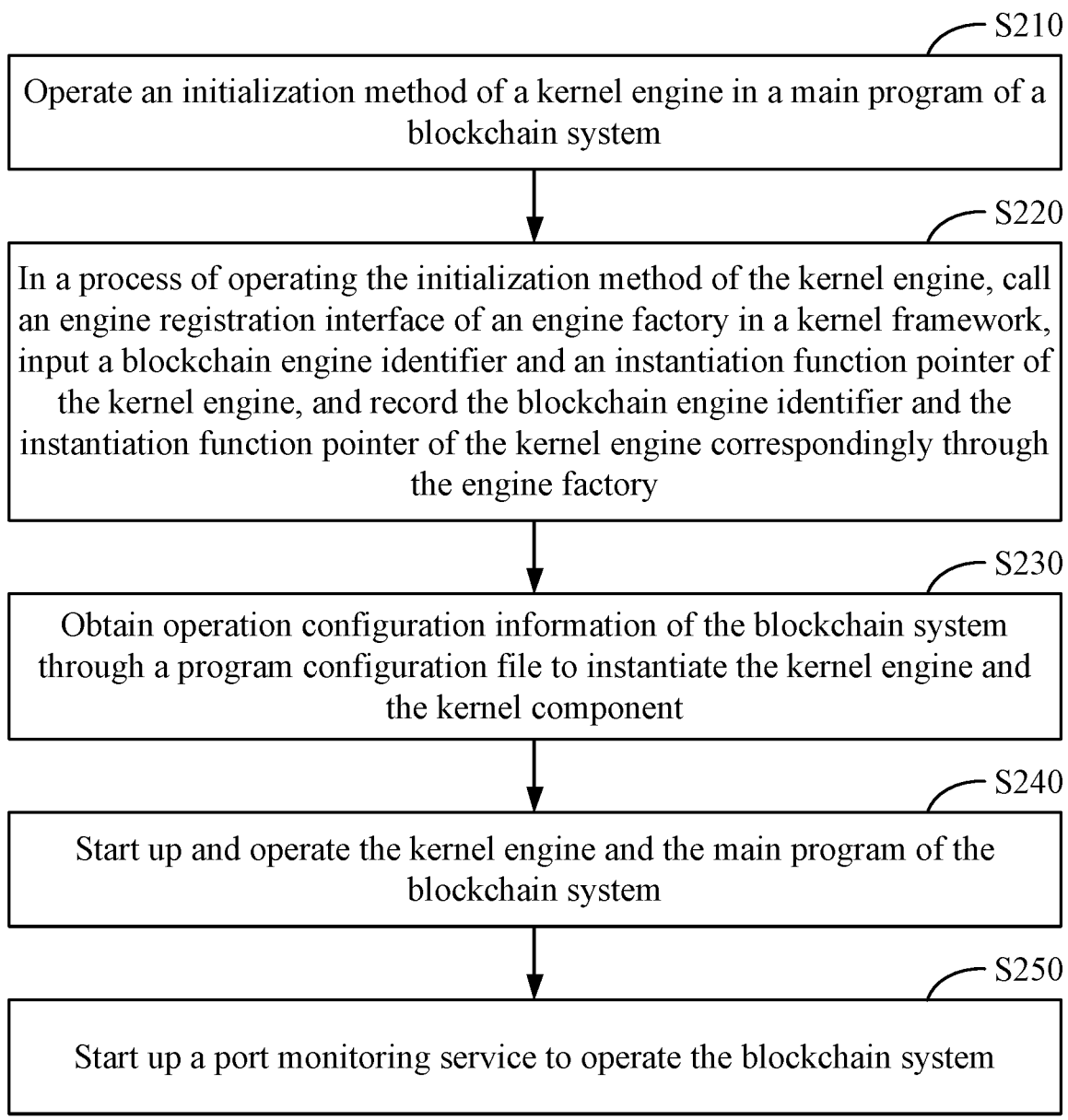
FIG. 2 is a schematic diagram of another method for starting up a blockchain system according to an embodiment of the present application.

FIG. 2 is a schematic diagram of another method for starting up a blockchain system according to an embodiment of the present application. This embodiment is a scheme provided based on the preceding embodiment. Specifically, an initialization process of the kernel engine is refined.

Referring to FIG. 2, the method for starting up a blockchain system provided in this embodiment includes the steps described below.

In S210, an initialization method of a kernel engine in a main program of a blockchain system is operated.

After the main program of the blockchain system is generated, the initialization method of the kernel engine is operated to initialize the kernel engine. Specifically, a process of registering the kernel engine to an engine factory is completed by operating the initialization method of the kernel engine.

The initialization method of the kernel engine refers to a method for initializing the kernel engine. Specifically, in the operation of the initialization method of the kernel engine, the operation of importing a kernel engine code package into a main program file may be performed.

The initialization method of the kernel engine is operated to initialize the kernel engine. Specifically, a registration function of the engine factory is called through a package initialization method in the kernel engine code package, the package initialization method in the kernel engine package is automatically executed when the kernel engine code package is imported into the main program file, and the kernel engine is registered to the engine factory.

In S220, in a process of operating the initialization method of the kernel engine, an engine registration interface of an engine factory in a kernel framework is called, a blockchain engine identifier and an instantiation function pointer of the kernel engine are inputted, and the blockchain engine identifier and the instantiation function pointer of the kernel engine are recorded correspondingly through the engine factory.

The engine registration interface is an interface used for registering the kernel engine to the engine factory. The process of operating the initialization method of the kernel engine is a process of initializing the kernel engine. Specifically, the engine registration interface is called through the main program, and the blockchain engine identifier and the instantiation function pointer of the kernel engine are inputted to the engine factory based on the engine registration interface. The blockchain engine identifier refers to identification information of the kernel engine that needs to be registered in the engine factory. By way of example, the blockchain engine identifier may be the name or unique number of the kernel engine. The instantiation function pointer of the kernel engine points to a storage address of the kernel engine code, and a storage location of the corresponding kernel engine code can be addressed according to the instantiation function pointer of the kernel engine.

After the engine factory obtains the blockchain engine identifier and the instantiation function pointer of the kernel engine through the engine registration interface, the engine factory records the blockchain engine identifier and the instantiation function pointer of the kernel engine to complete a registration process of the kernel engine. In an embodiment, the engine factory may form a kernel engine registration list based on the recorded blockchain engine identifier and the recorded instantiation function pointer of the kernel engine, to instantiate and control the kernel engine subsequently.

In S230, operation configuration information of the blockchain system is obtained through a program configuration file to instantiate the kernel engine and the kernel component.

After the kernel engine is registered in the engine factory, the kernel component needs to be registered to a corresponding component adapter. After both the kernel engine and the kernel component are registered, the operation configuration information of the blockchain system is obtained through the program configuration file, and the kernel engine and the kernel component are instantiated according to the obtained operation configuration information of the blockchain system.

In S240, the kernel engine and the main program of the blockchain system are started up and operated.

In S250, a port monitoring service is started up to operate the blockchain system.

In the technical scheme in the embodiment of the present application, the startup process of the blockchain system is achieved by operating the main program of the blockchain system. In the embodiment of the present application, in the startup process of the blockchain system, the blockchain engine identifier and the instantiation function pointer of the kernel engine are inputted by calling the engine registration interface of the engine factory in the kernel framework, the blockchain engine identifier and the instantiation function pointer of the kernel engine are recorded correspondingly through the engine factory, and the kernel engine is registered to the engine factory. Then, the kernel engine and the kernel component are instantiated according to the operation configuration information of the blockchain system so that the technical specification selections of the kernel component and the kernel engine in the case of no code invasion for the kernel component are achieved, the modular design of the kernel engine and the kernel component is achieved, and the scenario applicability of the blockchain system is expanded. In this manner, the difficulty of developing the blockchain system is reduced so that the user only needs to expand functions of the kernel component or the kernel engine according to scenario requirements and thus the research and development costs of the blockchain technology can be greatly reduced.

Figure 3:
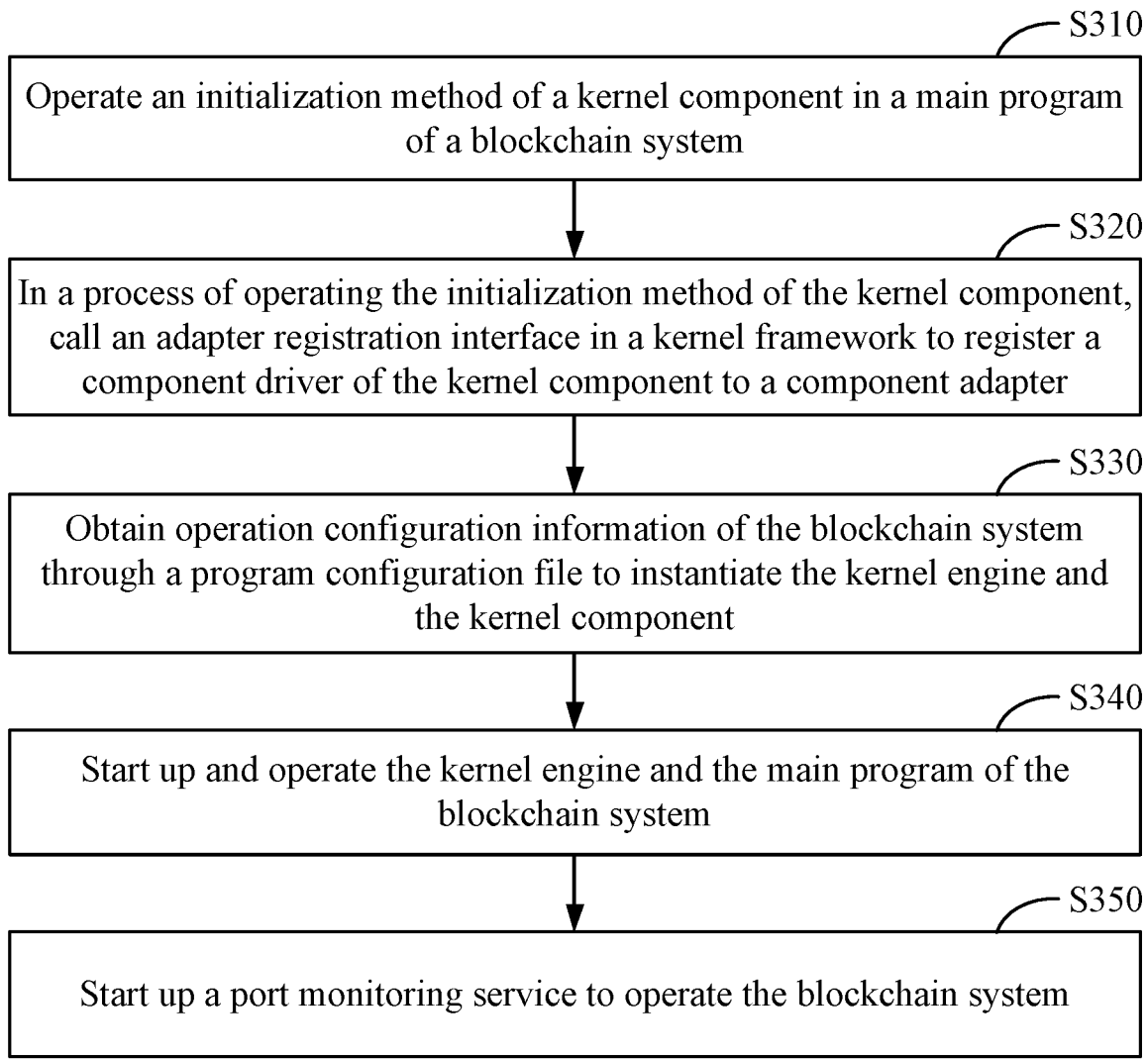
FIG. 3 is a schematic diagram of another method for starting up a blockchain system according to an embodiment of the present application.

FIG. 3 is a schematic diagram of another method for starting up a blockchain system according to an embodiment of the present application. This embodiment is a scheme provided based on the preceding embodiments. Specifically, an initialization process of the kernel component is refined.

Referring to FIG. 3, the method for starting up a blockchain system provided in this embodiment includes the steps described below.

In S310, an initialization method of a kernel component in a main program of a blockchain system is operated.

The initialization method of the kernel component refers to a method for initializing the kernel component. Specifically, in the operation of the initialization method of the kernel component, the operation of importing a kernel component code package into a main program file is performed.

The initialization method of the kernel component is operated, to initialize the kernel component. Specifically, a registration function of a corresponding adapter is called through a package initialization method in the kernel component code package, the package initialization method in the kernel component package is automatically executed when the kernel component code package is imported into the main program file, and the kernel component is registered to the corresponding component adapter.

In S320, in a process of operating the initialization method of the kernel component, an adapter registration interface in a kernel framework is called to register a component driver of the kernel component to a component adapter.

The adapter registration interface is an interface used for registering the kernel component to the component adapter. In the process of operating the initialization method of the kernel component, the main program calls the adapter registration interface and registers all kernel instruction interfaces to the corresponding component adapter based on the adapter registration interface. In an embodiment, a component instruction interface is agreed upon by the adapter and implemented by the component driver. In the registration process of the kernel component, the component driver is registered to the component adapter, which is equivalent to registering specific implementation logics of the kernel component. After registration, the adapter may call these processing logics to complete the component function processing through the component instruction interface.

In an embodiment, the component adapter may form a kernel instruction interface registration list according to the recorded kernel instruction interfaces so that the component adapter can determine, according to the processing logics, corresponding kernel instruction interfaces when the kernel component interface is called.

In S330, operation configuration information of the blockchain system is obtained through a program configuration file to instantiate the kernel engine and the kernel component.

It can be known that a process of registering the kernel component to the corresponding component adapter is performed after the kernel engine is registered to the engine factory. After both the kernel engine and the kernel component are registered, the operation configuration information of the blockchain system is obtained through the program configuration file, and the kernel engine and the kernel component are instantiated according to the obtained operation configuration information of the blockchain system.

In S340, the kernel engine and the main program of the blockchain system are started up and operated.

In S350, a port monitoring service is started up to operate the blockchain system.

In the technical scheme of the embodiment of the present application, the startup process of the blockchain system is achieved by operating the main program of the blockchain system. In the embodiment of the present application, in the startup process of the blockchain system, the component driver of the kernel component is registered to the component adapter by calling the adapter registration interface in the kernel framework so that the kernel instruction interfaces are registered to the component adapter. Then, according to the operation configuration information of the blockchain system, the kernel engine and the kernel component are instantiated so that when the kernel component interface is called, the component adapter can determine the kernel instruction interface corresponding to the kernel component interface from the registered kernel instruction interfaces according to the processing logics registered in the component adapter. In this manner, the technical specification selections of the kernel component and the kernel engine in the case of no code invasion for the kernel component are achieved, the modular design of the kernel engine and the kernel component is achieved, and the scenario applicability of the blockchain system is expanded. Therefore, the difficulty of developing the blockchain system is reduced so that the user only needs to expand functions of the kernel component or the kernel engine according to scenario requirements and thus the research and development costs of the blockchain technology can be greatly reduced.

Figure 4:
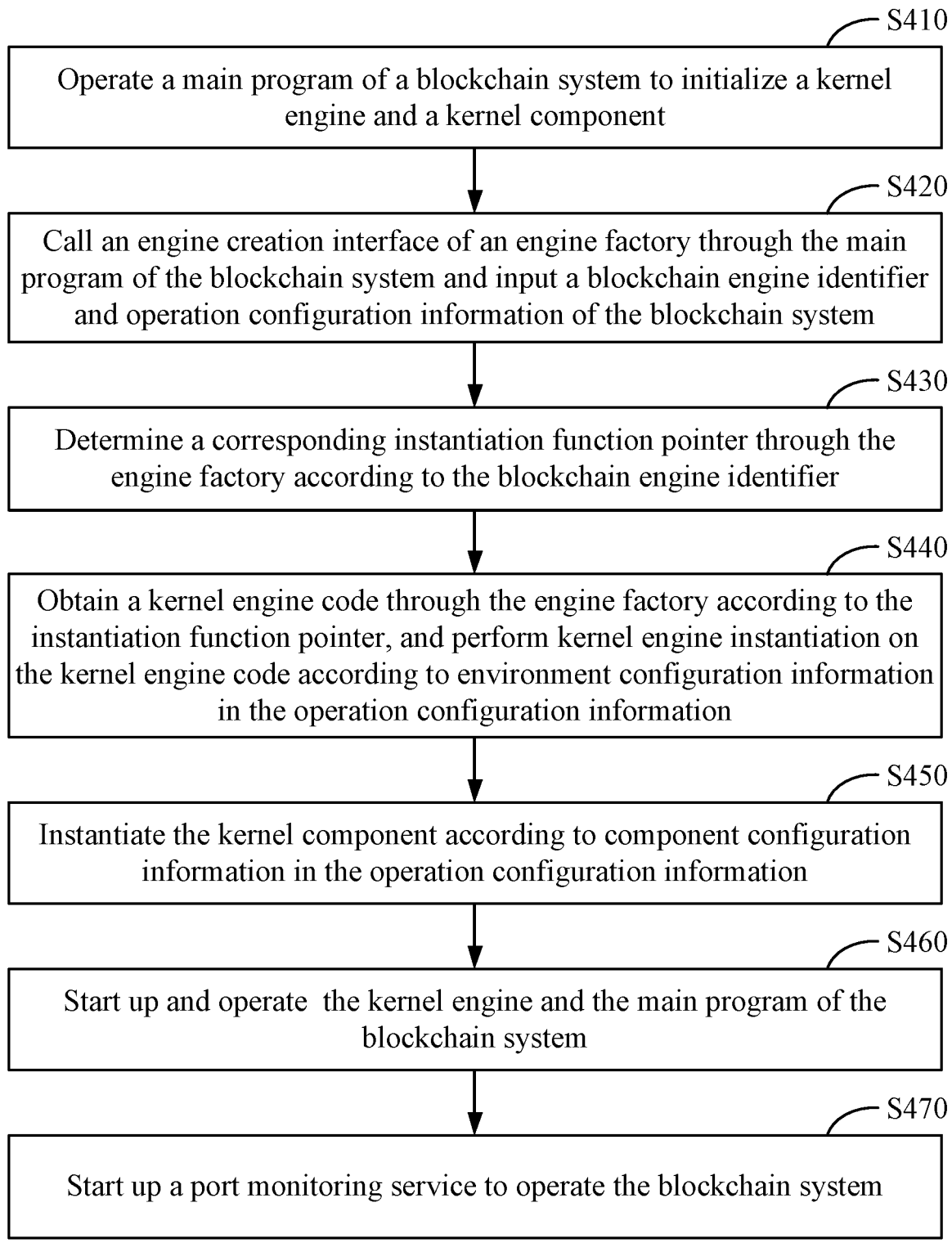
FIG. 4 is a schematic diagram of another method for starting up a blockchain system according to an embodiment of the present application.

FIG. 4 is a schematic diagram of another method for starting up a blockchain system according to an embodiment of the present application. This embodiment is a scheme provided based on the preceding embodiments. Specifically, the step of obtaining operation configuration information of the blockchain system through a program configuration file to instantiate the kernel engine and the kernel component is refined.

Referring to FIG. 4, the method for starting up a blockchain system provided in this embodiment includes the steps described below.

In S410, a main program of a blockchain system is operated to initialize a kernel engine and a kernel component.

In S420, an engine creation interface of an engine factory is called through the main program of the blockchain system and a blockchain engine identifier and operation configuration information of the blockchain system are inputted.

The engine creation interface is provided by the engine factory for the main program of the blockchain system and the engine creation interface is an interface used for creating the kernel engine. The blockchain engine identifier and the operation configuration information of the blockchain system may be inputted to the engine factory through the engine creation interface. The blockchain engine identifier is configured to index a kernel engine required to be instantiated among kernel engines that have been registered to the engine factory. The kernel engine corresponding to the blockchain engine identifier is instantiated according to the operation configuration information of the blockchain system.

In S430, a corresponding instantiation function pointer is determined according to the blockchain engine identifier through the engine factory.

The engine factory records the blockchain engine identifier and the instantiation function pointer of the kernel engine. In the case where the blockchain engine identifier is known, the instantiation function pointer of the kernel engine corresponding to the blockchain engine identifier may be determined in the engine factory, and then the kernel engine required to be instantiated is determined according to the instantiation function pointer of the kernel engine.

In S440, a kernel engine code is obtained through the engine factory according to the instantiation function pointer, and kernel engine instantiation is performed on the kernel engine code according to environment configuration information in the operation configuration information.

The instantiation function pointer points to an address where the corresponding kernel engine code is stored and the kernel engine code may be obtained according to the instantiation function pointer. After the kernel engine code is obtained, the kernel engine instantiation is performed on the kernel engine code according to the environment configuration information in the operation configuration information. Specifically, parameters in the kernel engine code are assigned according to the environment configuration information.

The environment configuration information is information used for instantiating the kernel engine. In an embodiment, the environment configuration information includes at least one of the following: a chain name of a root chain, a configuration file directory, a data storage directory, a log file directory, a certificate file directory, a node address file directory, an engine configuration file name, a log configuration file name, a service configuration file name, a blockchain ledger storage directory, a network configuration file name, or a ledger configuration file name. It can be known that the environment configuration information is not limited to the preceding information, but also includes other possible environment information, which is not limited herein, and is determined according to an actual situation.

The instantiation of the kernel component is completed in a process of instantiating the kernel engine, that is, in the process of instantiating the kernel engine, the kernel component is instantiated at the same time. In the preceding environment configuration information, the blockchain ledger storage directory, the network configuration file name, and the ledger configuration file name are information used for instantiating the kernel component. The kernel engine may transmit the environment configuration information used for instantiating the kernel component in the environment configuration information to the corresponding kernel component. For example, the ledger configuration file name is used for configuring the ledger component and determining ledger data of a blockchain node that needs to be processed by the ledger component. A network configuration file is determined according to the network configuration file name. According to monitoring application layer service configuration information in the network configuration file, the monitoring service is started up and instantiated, an application layer interaction port through which the kernel engine interacts with the application layer that needs to be monitored is determined, and the application layer interaction port is monitored.

In S450, the kernel component is instantiated according to component configuration information in the operation configuration information.

The component configuration information is configuration information used for instantiating the component. In the embodiment of the present application, kernel components may be functionally divided into a contract component, a network component, and a consensus component. A set of kernel components of each type may further include multiple kernel components of different subtypes in combination with application scenarios and characteristics of the kernel components. In an embodiment, the component configuration information includes specification selection information of the kernel component, and according to the specification selection information of the kernel component, a corresponding kernel component is determined in the kernel components and then instantiated. The specification selection information is determined by the user according to actual business requirements.

In an embodiment, different kernel components have different functions, and corresponding component configuration information is different. In an embodiment, the component configuration information of the consensus component includes a consensus component type and consensus algorithm configuration information, where the consensus component type refers to the specification selection information of a consensus algorithm. By way of example, the consensus component includes a single component, an xpos component, an xpoa component, and a pow component. The consensus algorithm configuration information refers to the component configuration information for a specific consensus algorithm. By way of example, the consensus algorithm configuration information for a pow consensus includes mining difficulty configuration; and the consensus algorithm configuration information for a pos consensus includes a block generation period and an initial candidate.

The component configuration information of the ledger component includes a storage engine and a data storage manner, where the storage engine refers to a kernel engine configured to store the ledger data, and the data storage manner refers to a storage manner of the ledger data. By way of example, the data storage manner includes single disk storage and multi-disk storage.

The component configuration information of the contract component includes contract virtual-machine configuration information and a contract upgrade switch, where the contract virtual-machine configuration information refers to information used for configuring a contract virtual machine. Generally, for a smart contract, a virtual machine needs to be created, and the smart contract is operated in the virtual machine to process a transaction request; the contract upgrade switch refers to information used for controlling whether the smart contract is allowed to be upgraded.

The component configuration information of the network component includes a network component name, a node address, a node key address, and a seed node address. The network component name refers to specification selection information of the network component.

In an embodiment, before the kernel component is instantiated according to the component configuration information in the operation configuration information, the method further includes loading the blockchain data on which the blockchain system is based according to a blockchain data storage address in the operation configuration information.

The blockchain data storage address refers to an address where the blockchain data is stored, and the blockchain data refers to data involved in a process of completing a requirement for processing the to-be-processed blockchain data by the blockchain system. By way of example, in the case where the to-be-processed blockchain data is a transaction submission request, a processing process of the submitted transaction by the blockchain system includes verifying the to-be-submitted transaction. For example, in the case where a set amount of remittance is made from an account of node A to an account of node B and ledger verification is performed on the to-be-verified ledger data, the blockchain data storage address is a storage address of the ledger data of node A and node B.

According to the blockchain data storage address in the operation configuration information, the blockchain data required by the blockchain system in the process of processing the to-be-processed blockchain data is loaded from the blockchain data storage address to the blockchain system, to support an operation of processing the to-be-processed blockchain data by the blockchain system.

In S460, the kernel engine and the main program of the blockchain system are started up and operated.

In S470, a port monitoring service is started up to operate the blockchain system.

In the technical scheme in the embodiment of the present application, the startup process of the blockchain system is achieved by operating the main program of the blockchain system. In the embodiment of the present application, in the startup process of the blockchain system, the kernel engine is registered to the engine factory, the kernel component is registered to the corresponding component adapter, and the kernel engine and the kernel component are instantiated according to the operation configuration information of the blockchain system so that the technical specification selections of the kernel component and the kernel engine in the case of no code invasion for the kernel component are achieved, the modular design of the kernel engine and the kernel component is achieved, and the scenario applicability of the blockchain system is expanded. According to the method for starting up a blockchain system provided in the present application, the difficulty of developing the blockchain system is reduced so that the user only needs to expand functions of the kernel component or the kernel engine according to scenario requirements and thus the research and development costs of the blockchain technology can be greatly reduced.

Figure 5:
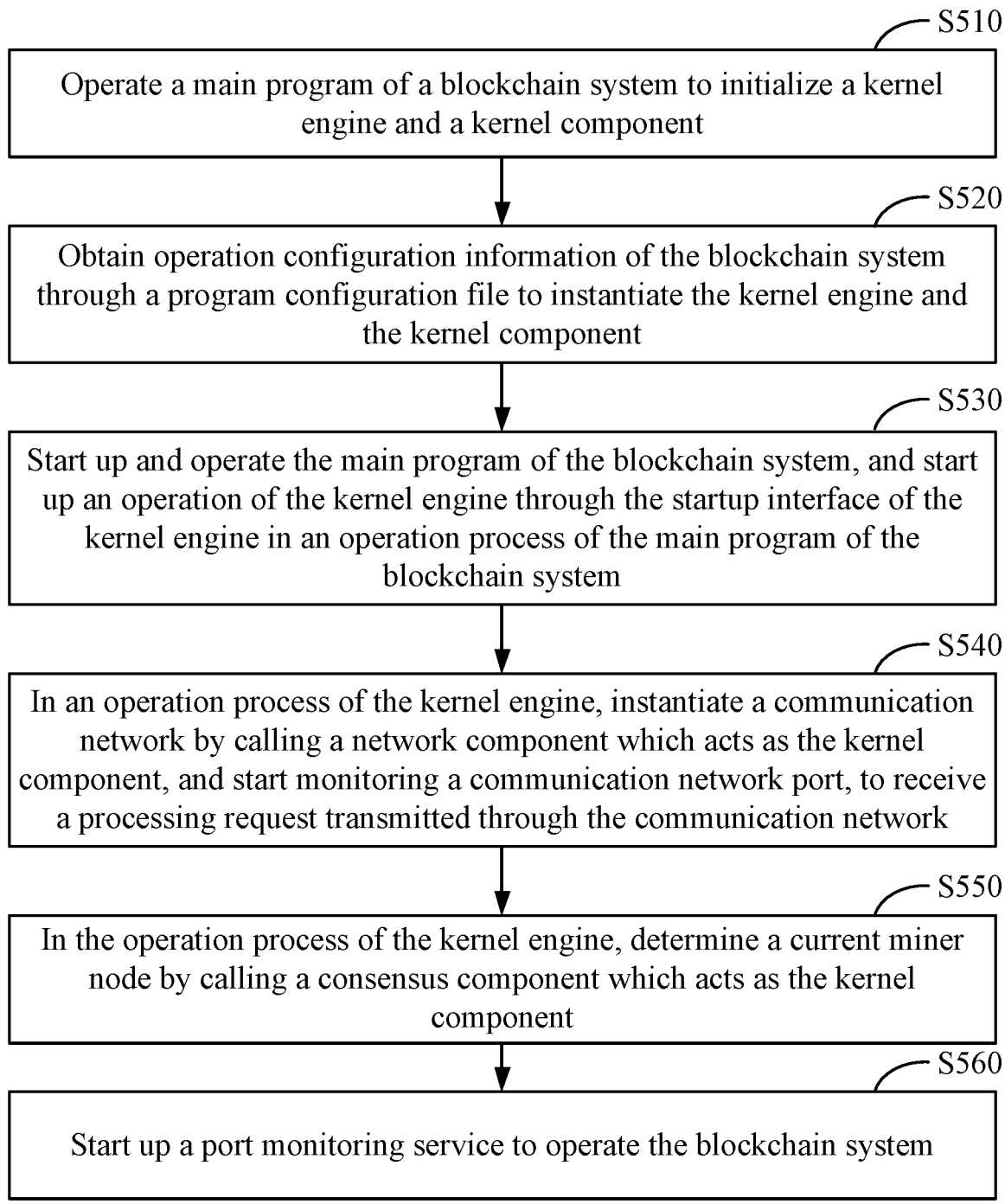
FIG. 5 is a schematic diagram of another method for starting up a blockchain system according to an embodiment of the present application.

FIG. 5 is a schematic diagram of another method for starting up a blockchain system according to an embodiment of the present application. This embodiment is a scheme provided based on the preceding embodiments. Specifically, the step of starting up and operating the kernel engine and the main program of the blockchain system is refined.

Referring to FIG. 5, the method for starting up a blockchain system provided in this embodiment includes the steps described below.

In S510, a main program of a blockchain system is operated to initialize a kernel engine and a kernel component.

In S520, operation configuration information of the blockchain system is obtained through a program configuration file to instantiate the kernel engine and the kernel component.

In S530, the main program of the blockchain system is started up and operated, and an operation of the kernel engine is started up through a startup interface of the kernel engine in an operation process of the main program of the blockchain system.

The main program of the blockchain system is started up and operated, the startup and operation of the kernel engine are controlled through the main program of the blockchain system, so that the application layer business function is achieved.

Since the main program of the blockchain system includes the startup interface of the kernel engine, in the operation process of the main program of the blockchain system, the main program of the blockchain system starts up the operation of the kernel engine through the startup interface of the kernel engine to complete the startup and operation of the kernel engine and the main program of the blockchain system.

In S540, in an operation process of the kernel engine, a communication network is instantiated by calling a network component which acts as the kernel component, and the monitoring of a communication network port is started up to receive a processing request transmitted through the communication network.

The application layer business function is implemented under the premise that the kernel engine is capable of performing information interaction with the kernel component and the application layer. As one of the very important kernel components of the blockchain system, the network component is responsible for the network interaction between blockchain nodes in the blockchain system.

In the operation process of the kernel engine, the kernel engine instantiates the communication network by calling the network component, the monitoring of the communication network port is started up, and the processing request transmitted through the communication network is received through the network component.

The communication network port is a port for communication and interaction between the kernel engine and the application layer or the kernel component. The processing request is also transmitted between the kernel engine and the kernel component and between the kernel engine and the application layer through the communication network port. The processing request may be a pending transaction request that is initiated by the application layer to the blockchain system, such as a business transaction request or a management transaction request, or the processing request may be data generated by a block node in the blockchain in the startup process of the blockchain system, such as a to-be-verified block, a to-be-synchronized block, or blockchain system maintenance data.

In S550, in the operation process of the kernel engine, a current miner node is determined by calling a consensus component which acts as the kernel component.

The consensus component is responsible for reaching a consensus of multi-node decentralization in the blockchain network, and the consensus component is a very core component of the blockchain and a prerequisite for achieving self-trust of the blockchain. The self-trust of the blockchain is mainly embodied in that the user distributed in the blockchain does not need to trust the other party of the transaction, does not need to trust a centralized organization, and only needs to trust a software system under a blockchain protocol to achieve the transaction.

In the operation process of the kernel engine, the consensus component may be called to determine the current miner node, where the miner node refers to a block generation node used for generating a new block.

In S560, a port monitoring service is started up to operate the blockchain system.

In the technical scheme in the embodiment of the present application, the startup process of the blockchain system is achieved by operating the main program of the blockchain system. In the embodiment of the present application, in the startup process of the blockchain system, the main program of the blockchain system starts up the kernel engine through the startup interface of the kernel engine, and the network component and the consensus component are called in the operation process of the kernel engine so that the technical specification selections of the kernel component and the kernel engine in the case of no code invasion for the kernel component are achieved, the modular design of the kernel engine and the kernel component is achieved, and the scenario applicability of the blockchain system is expanded. According to the method for starting up a blockchain system provided in the present application, the difficulty of developing the blockchain system is reduced so that the user only needs to expand functions of the kernel component or the kernel engine according to scenario requirements and thus the research and development costs of the blockchain technology can be greatly reduced.

Figure 6A:
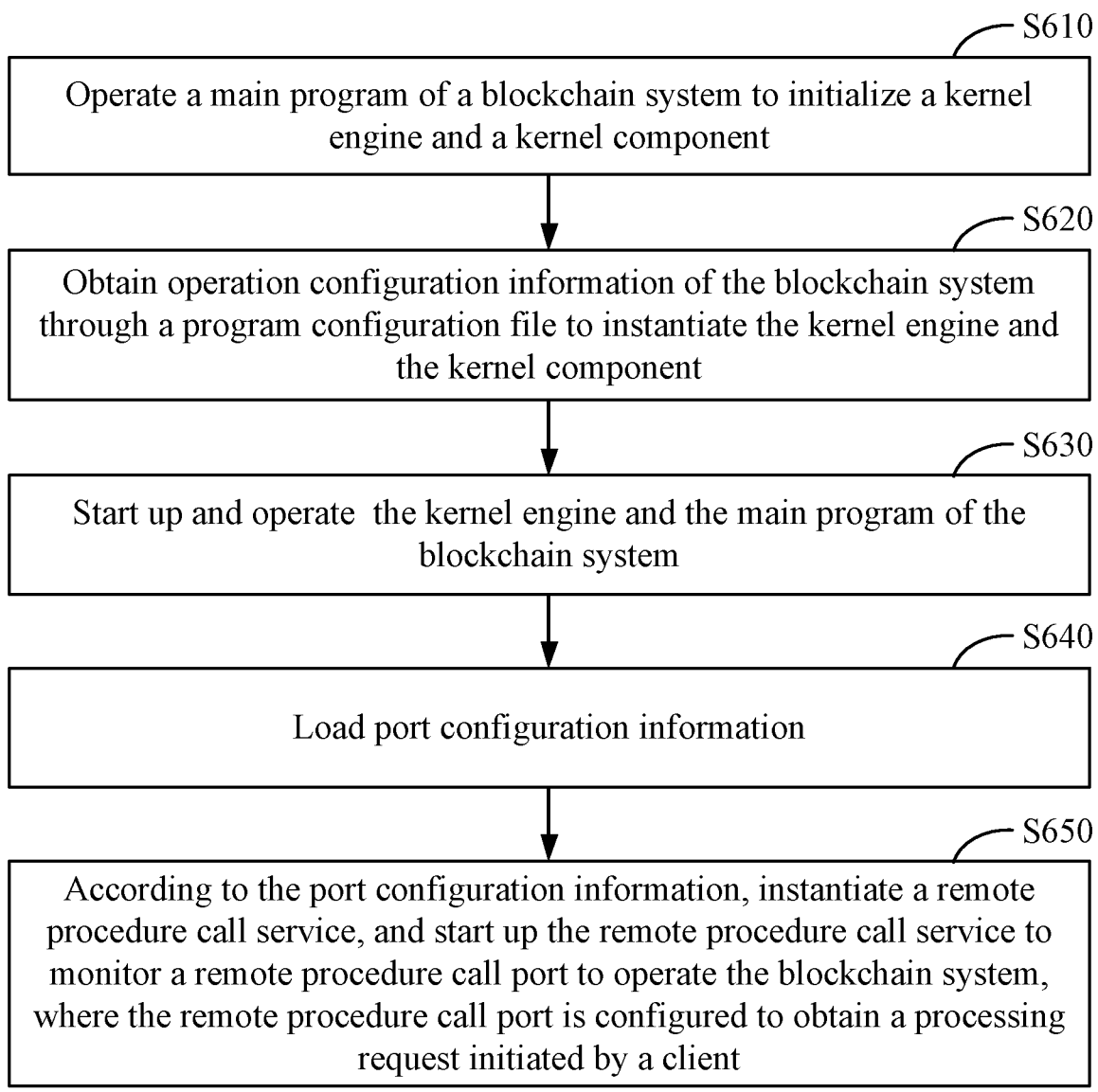
FIG. 6A is a schematic diagram of another method for starting up a blockchain system according to an embodiment of the present application.

FIG. 6A is a schematic diagram of another method for starting up a blockchain system according to an embodiment of the present application. This embodiment is a scheme provided based on the preceding embodiments. Specifically, the step of starting up a port monitoring service is refined.

Referring to FIG. 6A, the method for starting up a blockchain system provided in this embodiment includes the steps described below.

In S610, a main program of a blockchain system is operated to initialize a kernel engine and a kernel component.

In S620, operation configuration information of the blockchain system is obtained through a program configuration file to instantiate the kernel engine and the kernel component.

In S630, the kernel engine and the main program of the blockchain system are started up and operated.

In S640, port configuration information is loaded.

The port configuration information is information used for determining a remote procedure call port that needs to be monitored. At least one remote procedure call port is provided, and generally, multiple remote procedure call ports are provided. The remote procedure call port included in the port configuration information refers to a port for communication and interaction between the application layer and the kernel engine.

In S650, according to the port configuration information, a remote procedure call service is instantiated, and the remote procedure call service is started up to monitor a remote procedure call port, to operate the blockchain system, where the remote procedure call port is configured to obtain a processing request initiated by a client.

The port configuration information includes remote procedure call port identification information, and a port that needs to be monitored is determined in the remote procedure call ports according to a remote procedure call port identifier in the port configuration information. The remote procedure call port is a port for information interaction between the kernel engine and the client.

Specifically, the remote procedure call service is assigned according to the port configuration information, and whether a processing request exists in the remote procedure call port that needs to be monitored is determined through the remote procedure call service. In the case where the remote procedure call service monitors the processing request transmitted by the client, a processing flow of the processing request by the blockchain system is triggered.

In the technical scheme of the embodiment of the present application, the startup process of the blockchain system is achieved by operating the main program of the blockchain system. In the embodiment of the present application, in the startup process of the blockchain system, according to the port configuration information, the remote procedure call service is instantiated, and the remote procedure call service is started up to monitor the remote procedure call port, so that in the case where the remote procedure call service monitors the processing request transmitted by the client, the processing flow of the processing request by the blockchain system is triggered. In this manner, the modular design of the kernel engine and the kernel component is achieved, and the scenario applicability of the blockchain system is expanded. According to the method for starting up a blockchain system provided in the present application, the difficulty of developing the blockchain system is reduced so that the user only needs to expand functions of the kernel component or the kernel engine according to scenario requirements and thus the research and development costs of the blockchain technology can be greatly reduced.

Figure 6B:
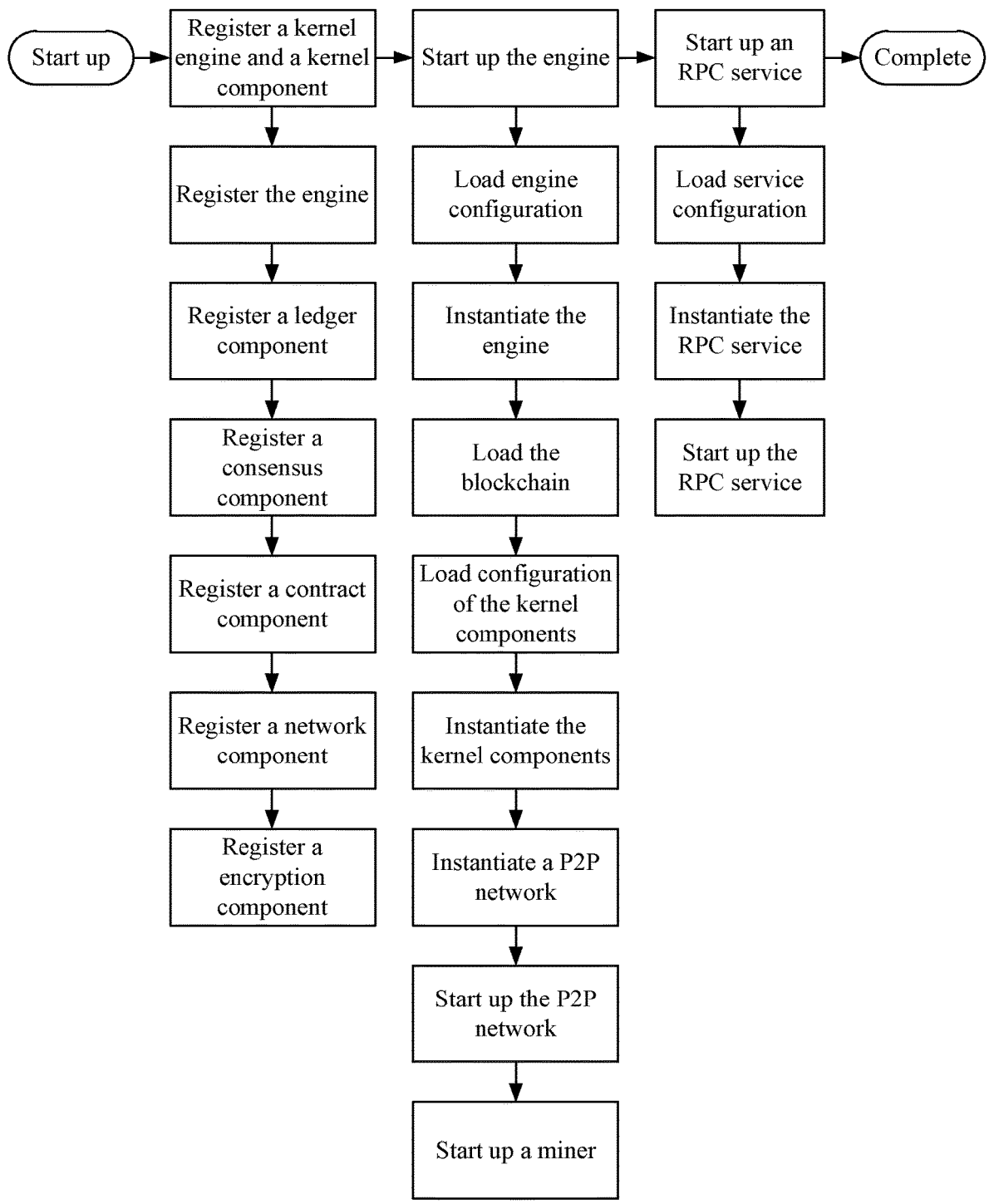
FIG. 6B is a schematic diagram of another method for starting up a blockchain system according to an embodiment of the present application.

FIG. 6B is a schematic diagram of another method for starting up a blockchain system according to an embodiment of the present application. In a specific embodiment, a complete startup process of the blockchain system is shown in FIG. 6B. Specifically, the following steps are included. 1. A main program of a blockchain system is started up and operated, and a kernel engine and a kernel component are registered in the startup and operation of the main program of the blockchain system. A specific process of registering the kernel engine and the kernel component is as follows: the kernel engine is registered to an engine factory, and then a ledger component, a consensus component, a contract component, a network component, and an encryption component are registered to corresponding component adapters. 2. The kernel engine and the kernel component are instantiated. In a process of instantiating the kernel engine and the kernel component, engine configuration information is loaded, the kernel engine is instantiated according to the engine configuration information, blockchain data on which the blockchain system is based is loaded and configuration information of kernel components is loaded in the process of instantiating the kernel engine, the kernel components are instantiated separately according to the configuration information of the kernel components, a peer-to-peer network is instantiated and started up in an operation process of the kernel engine, and then a miner node is started up. 3. A remote procedure call service (RPC service) is started up. A specific process of starting up the RPC service is loading service configuration information, then instantiating the RPC service according to the service configuration information, and starting up the RPC service after the instantiation is completed. At this point, the startup of the blockchain system is completed.

After the kernel engine and the kernel component are initialized by operating the main program, the blockchain system is started up and operated, and the blockchain data is processed by the blockchain system. In the process of processing the blockchain data, the function of the kernel engine is different from the function of the kernel component. Only through the cooperation of the kernel engine and the kernel component can the requirement for processing the blockchain data be completed.

In an embodiment, the kernel engine is configured to execute a blockchain kernel process, where the kernel process includes at least one of the following: a transaction submission process, a block verification process, a block synchronization process, or a blockchain system management function.

The transaction submission process refers to a process of one transaction submission; by way of example, the transaction submission process includes steps such as transaction verification, transaction execution, transaction packaging, block signature, block update, and block broadcast. The block verification process refers to a process in which a local node verifies a block; by way of example, in the case where other nodes are determined to be block generation nodes, to ensure the safety and effectiveness of data, the local node needs to verify the block generation node; specifically, the local node needs to verify a block height of a block node to ensure that the current block generation node is consistent with a block generation node determined by the local node according to the consensus mechanism. The block synchronization process refers to a process of synchronizing transaction processing data in other block nodes in the blockchain. The blockchain system management function refers to a function used for maintaining the blockchain system, such as changing the block generation nodes, managing nodes, and monitoring a network status.

In an embodiment, the kernel engine is configured to call at least one kernel component based on the kernel component interface in the process of processing the blockchain data. The kernel component is configured to execute a set component function in an operation process of the blockchain.

The kernel component interface is the abstraction of an achievable function of the kernel component, each kernel component in the blockchain system has a corresponding kernel component interface, and one kernel component interface may correspond to multiple kernel components. The kernel engine only needs to select a required kernel component function according to the to-be-processed blockchain data without the need to consider a specific implementation of the kernel component function. The kernel engine may call the kernel component by calling the kernel component interface and execute the processing of the set component function through the kernel component to complete the requirement for processing the blockchain data.

In an embodiment, the kernel engine is configured to, in the process of processing the blockchain data, initiate a kernel component call request based on the kernel component interface provided by a component adapter and call at least one kernel component through a kernel instruction interface registered in the component adapter.

The component adaptor is configured in the kernel engine layer. The component adaptor serves as a translator and is configured to abstract a function of each kernel component into the kernel component interface which may be directly called by the kernel engine, and the component adaptor shields the kernel engine from implementation details of the function of the kernel component. No matter which type of kernel component it is, no matter how the component function is implemented internally, the kernel component interface abstracted by the component adaptor and provided for the kernel engine is a standardized interface. In this manner, a loose coupling relationship between the kernel engine and the kernel component is maintained so that both the kernel engine and the kernel component can be freely expanded and replaced.

The kernel component interface is mainly oriented to the kernel engine and provides a normalized call interface for the kernel engine. Different from the kernel component interface, the kernel instruction interface is oriented to the kernel component, and in the case where the kernel engine calls the kernel component, converts a kernel component call instruction into an instruction form recognizable by the corresponding kernel component. The kernel instruction interface is registered to the component adapter in the initialization process of the kernel component. When the kernel component interface is called, the component adapter may determine the corresponding kernel instruction interface from the registered kernel instruction interfaces according to the kernel component interface.

The kernel engine determines the required kernel component interface from kernel component interfaces provided by the component adapter according to the blockchain data and generates a kernel component call request based on the kernel component interface. Through the kernel instruction interface registered to the component adapter, the kernel component call request is converted into an instruction-level form that can be directly recognized by the kernel component, the corresponding kernel component is called through the kernel instruction interface, and the processing of the set component function is performed through the kernel component, to complete the requirement for processing the blockchain data.

In the technical scheme of the embodiment of the present application, the kernel engine cooperates with the kernel component so that the requirement for processing the blockchain data is satisfied. In the present application, both the kernel engine and the kernel component use a modular design and cooperate to operate through the component adaptor, to achieve the loose coupling between modules. The component adaptor provides the kernel component interface for the kernel engine to enable the kernel engine to select the kernel component according to requirements. On the other hand, the component adaptor converts, through the kernel instruction interface, the kernel component call instruction of the kernel engine and the to-be-processed blockchain into a form recognizable by the kernel component. The component adaptor is introduced so that both the kernel engine and the kernel component can be freely expanded, thereby expanding the scenario applicability of the blockchain system. According to the method for starting up a blockchain system provided in the embodiment of the present application, the difficulty of developing the blockchain system is reduced so that the user only needs to expand functions of the kernel component or the kernel engine according to scenario requirements and thus the research and development costs of the blockchain technology can be greatly reduced.

Figure 7:
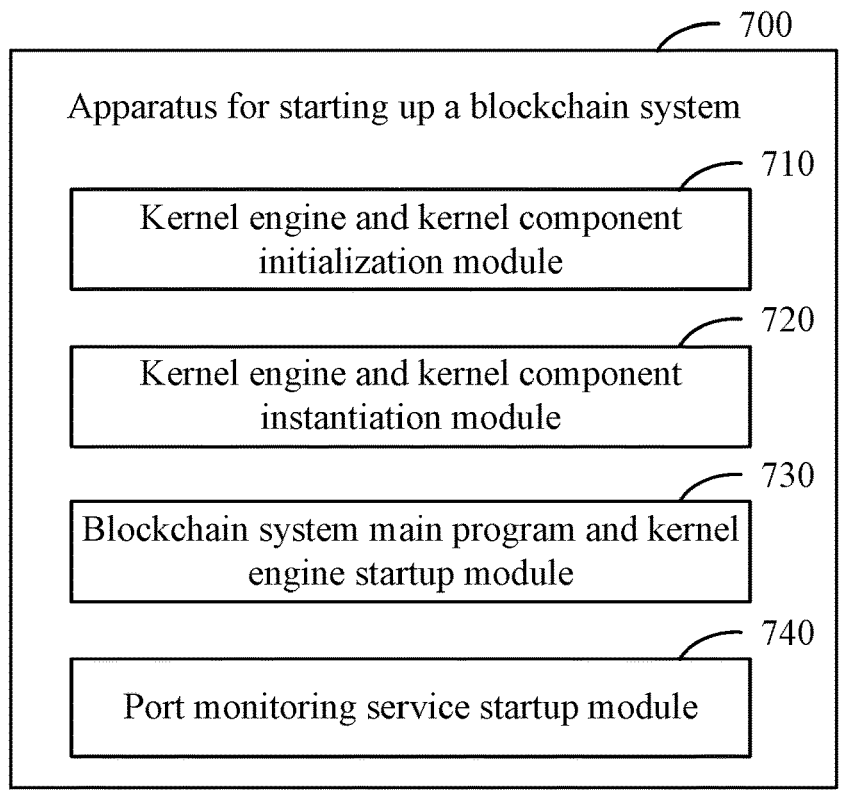
FIG. 7 is a schematic diagram of an apparatus for starting up a blockchain system according to an embodiment of the present application.

FIG. 7 is a schematic diagram of an apparatus for starting up a blockchain system according to an embodiment of the present application. Referring to FIG. 7, an embodiment of the present application provides an apparatus 700 for starting up a blockchain system configured at a blockchain node, and the apparatus 700 may include a kernel engine and kernel component initialization module 710, a kernel engine and kernel component instantiation module 720, a blockchain system main program and kernel engine startup module 730, and a port monitoring service startup module 740.

The kernel engine and kernel component initialization module 710 is configured to operate a main program of a blockchain system to initialize a kernel engine and a kernel component.

The kernel engine and kernel component instantiation module 720 is configured to obtain operation configuration information of the blockchain system through a program configuration file to instantiate the kernel engine and the kernel component.

The blockchain system main program and kernel engine startup module 730 is configured to start up and operate the kernel engine and the main program of the blockchain system.

The port monitoring service startup module 740 is configured to start up a port monitoring service to operate the blockchain system.

In the technical scheme in the embodiment of the present application, the startup process of the blockchain system is achieved by operating the main program of the blockchain system. In the embodiment of the present application, in the startup process of the blockchain system, the kernel engine is registered to the engine factory, the kernel component is registered to the corresponding component adapter, and the kernel engine and the kernel component are instantiated according to the operation configuration information of the blockchain system so that the technical specification selections of the kernel component and the kernel engine in the case of no code invasion for the kernel component are achieved, the modular design of the kernel engine and the kernel component is achieved, and the scenario applicability of the blockchain system is expanded. According to the method for starting up a blockchain system provided in the present application, the difficulty of developing the blockchain system is reduced so that the user only needs to expand functions of the kernel component or the kernel engine according to scenario requirements and thus the research and development costs of the blockchain technology can be greatly reduced.

In an embodiment, the main program of the blockchain system includes an initialization method, a startup interface, and an exit interface of the kernel engine, the main program of the blockchain system further includes an initialization method of at least one kernel component, and the kernel engine is configured to call at least one kernel component based on a kernel component interface in a process of processing blockchain data.

In an embodiment, the kernel engine is configured to, in the process of processing the blockchain data, initiate a kernel component call request based on the kernel component interface provided by a component adapter and call at least one kernel component through a kernel instruction interface registered to the component adapter.

In an embodiment, the main program of the blockchain system is configured to execute an application layer business function in the blockchain system; the kernel engine is configured to execute a blockchain kernel process; and the kernel component is configured to execute a set component function in an operation process of a blockchain.

In an embodiment, the kernel process includes at least one of the following: a transaction submission process, a block verification process, a block synchronization process, or a blockchain system management function; and the kernel component includes at least one of the following: a consensus component, a network component, a ledger component, a contract component, a permission component, or an encryption component.

In an embodiment, the kernel engine and kernel component initialization module include a kernel engine initialization submodule and a kernel component initialization submodule. The kernel engine initialization submodule is configured to operate the main program of the blockchain system to initialize the kernel engine. The kernel engine initialization submodule includes a kernel engine initialization method operation unit and an engine registration interface calling unit. The kernel engine initialization method operation unit is configured to operate the initialization method of the kernel engine in the main program of the blockchain system. The engine registration interface calling unit is configured to, in a process of operating the initialization method of the kernel engine, call an engine registration interface of an engine factory in a kernel framework, input a blockchain engine identifier and an instantiation function pointer of the kernel engine, and record the blockchain engine identifier and the instantiation function pointer of the kernel engine correspondingly through the engine factory.

In an embodiment, the kernel component initialization submodule is specifically configured to operate the main program of the blockchain system to initialize the kernel component. The kernel component initialization submodule includes a kernel component initialization operation unit and an adapter registration interface calling unit. The kernel component initialization operation unit is configured to operate the initialization method of the kernel component in the main program of the blockchain system. The adapter registration interface calling unit is configured to, in a process of operating the initialization method of the kernel component, call an adapter registration interface in the kernel framework to register a component driver of the kernel component to a component adapter.

In an embodiment, the kernel engine and kernel component instantiation module include an engine creation interface calling submodule, an instantiation function pointer determination submodule, a kernel engine instantiation submodule, and a kernel component instantiation submodule. The engine creation interface calling submodule is configured to call an engine creation interface of the engine factory through the main program of the blockchain system and input the blockchain engine identifier and the operation configuration information of the blockchain system. The instantiation function pointer determination submodule is configured to determine a corresponding instantiation function pointer through the engine factory according to the blockchain engine identifier. The kernel engine instantiation submodule is configured to obtain a kernel engine code through the engine factory according to the instantiation function pointer and perform kernel engine instantiation on the kernel engine code according to environment configuration information in the operation configuration information. The kernel component instantiation submodule is configured to instantiate the kernel component according to component configuration information in the operation configuration information.

In an embodiment, the environment configuration information includes at least one of the following: a chain name of a root chain, a configuration file directory, a data storage directory, a log file directory, a certificate file directory, a node address file directory, an engine configuration file name, a log configuration file name, a service configuration file name, a blockchain ledger storage directory, a network configuration file name, or a ledger configuration file name.

In an embodiment, the component configuration information of the consensus component includes a consensus component type and consensus algorithm configuration information; the component configuration information of the ledger component includes a storage engine and a data storage manner; the component configuration information of the contract component includes contract virtual-machine configuration information and a contract upgrade switch; and the component configuration information of the network component includes a network component name, a node address, a node key address, and a seed node address.

In an embodiment, the apparatus further includes a blockchain data loading module. The blockchain data loading module is configured to, before the kernel component is instantiated according to the component configuration information in the operation configuration information, load the blockchain data on which the blockchain system is based according to a blockchain data storage address in the operation configuration information.

In an embodiment, the blockchain system main program and kernel engine startup module include a kernel engine startup submodule, a communication network port monitoring startup submodule, and a current miner node determination submodule. The kernel engine startup submodule is configured to start up and operate the main program of the blockchain system and start up an operation of the kernel engine through the startup interface of the kernel engine in an operation process of the main program of the blockchain system. The communication network port monitoring startup submodule is configured to, in an operation process of the kernel engine, instantiate a communication network by calling a network component which acts as the kernel component, and start monitoring a communication network port to receive a processing request transmitted through the communication network. The current miner node determination submodule is configured to, in the operation process of the kernel engine, determine a current miner node by calling a consensus component as the kernel component.

In an embodiment, the port monitoring service startup module includes a port configuration information loading submodule and a remote procedure call service startup submodule. The port configuration information loading submodule is configured to load port configuration information. The remote procedure call service startup submodule is configured to, according to the port configuration information, instantiate a remote procedure call service and start up the remote procedure call service to monitor a remote procedure call port, where the remote procedure call port is configured to obtain a processing request initiated by a client.

The apparatus for starting up a blockchain system provided in the embodiment of the present application may execute the method for starting up a blockchain system provided in any embodiment of the present application and have corresponding functional modules and beneficial effects for executing the method for starting up a blockchain system.

According to the embodiments of the present application, the present application further provides an electronic device, a readable storage medium, and a computer program product.

Figure 8:
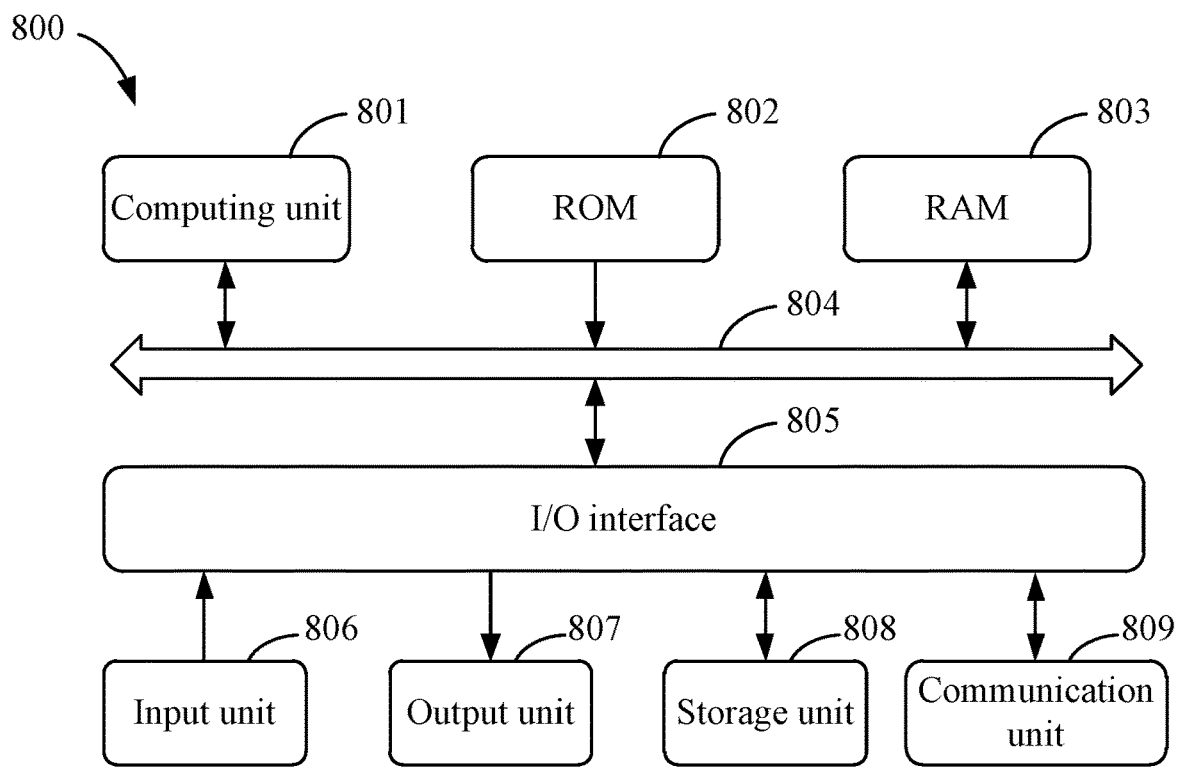
FIG. 8 is a block diagram of an electronic device for implementing a method for starting up a blockchain system according to an embodiment of the present application.

By way of example, FIG. 8 is a block diagram of an electronic device 800 for implementing the embodiments of the present application. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present application as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802, and the RAM 803 are connected to each other through a bus 804. An input/output (I/O) interface 805 is also connected to the bus 804.

Multiple components in the device 800 are connected to the I/O interface 805. The components include an input unit 806 such as a keyboard and a mouse, an output unit 807 such as various types of displays and speakers, the storage unit 808 such as a magnetic disk and an optical disk, and a communication unit 809 such as a network card, a modem and a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), various special-purpose artificial intelligence (AI) computing chips, various computing units executing machine learning models and algorithms, a digital signal processor (DSP) and any appropriate processor, controller and microcontroller. The computing unit 801 executes various preceding methods and processing, such as the method for starting up a blockchain system. For example, in some embodiments, the method for starting up a blockchain system may be implemented as a computer software program tangibly contained in a machine-readable medium such as the storage unit 808. In some embodiments, part or all of computer programs may be loaded and/or installed on the device 800 via the ROM 802 and/or the communication unit 809. When the computer programs are loaded to the RAM 803 and executed by the computing unit 801, one or more steps of the preceding method for starting up a blockchain system may be executed. Alternatively, in other embodiments, the computing unit 801 may be configured, in any other suitable manner (for example, by means of firmware), to execute the method for starting up a blockchain system.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the method of the present application may be written in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present application, a machine-readable medium may be a tangible medium that may contain or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. More specific examples of the machine-readable storage medium may include an electrical connection based on one or more wires, a portable computer disk, a hard disk, an RAM, an ROM, an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and virtual private server (VPS) services.

It is to be understood that various forms of the preceding flows may be used, with steps reordered, added or removed. For example, the steps described in the present disclosure may be executed in parallel, in sequence or in a different order as long as the desired result of the technical solution provided in the present application is achieved. The execution sequence of these steps is not limited herein.

What is claimed is:

1. A method for starting up a blockchain system, comprising: operating a main program of the blockchain system to initialize a kernel engine and at least one kernel component, wherein the main program of the blockchain system comprises an initialization method of the kernel engine and an initialization method of the at least one kernel component; obtaining operation configuration information of the blockchain system through a program configuration file to instantiate the kernel engine and the at least one kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, wherein the port monitoring service refers to a service in which an application layer interaction port for interacting between the kernel engine and an application layer is monitored, and the kernel engine is configured to call, in a process of processing blockchain data, the at least one kernel component based on a kernel component interface; wherein operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and wherein operating the main program of the blockchain system to initialize the at least one kernel component comprises: operating an initialization method of the at least one kernel component in the main program of the blockchain system; and in a process of operating the initialization method of the at least one kernel component, calling an adapter registration interface in a kernel framework to register a component driver of the at least one kernel component in a component adapter.

2. The method of claim 1, wherein the main program of the blockchain system comprises a startup interface of the kernel engine, and an exit interface of the kernel engine.

3. The method of claim 2, wherein the kernel engine is configured to, in the process of processing the blockchain data, initiate a kernel component call request based on the kernel component interface provided by a component adapter and call the at least one kernel component through a kernel instruction interface registered in the component adapter.

4. The method of claim 2, wherein the main program of the blockchain system is configured to execute an application layer business function in the blockchain system; the kernel engine is configured to execute a blockchain kernel process; and the at least one kernel component is configured to execute a set component function in a blockchain operation process.

5. The method of claim 4, wherein
the kernel process comprises at least one of the following: a transaction submission process, a block verification process, a block synchronization process, or a blockchain system management function; and
the at least one kernel component comprises at least one of the following: a consensus component, a network component, a ledger component, a contract component, a permission component, or an encryption component.

6. The method of claim 1, wherein obtaining the operation configuration information of the blockchain system through the program configuration file to instantiate the kernel engine and the at least one kernel component comprises:
calling, through the main program of the blockchain system, an engine creation interface of an engine factory and inputting a blockchain engine identifier and the operation configuration information of the blockchain system;
determining, through the engine factory, a corresponding instantiation function pointer according to the blockchain engine identifier;
obtaining, through the engine factory, a kernel engine code according to the instantiation function pointer, and performing kernel engine instantiation on the kernel engine code according to environment configuration information in the operation configuration information; and
instantiating the at least one kernel component according to component configuration information in the operation configuration information.

7. The method of claim 6, wherein the environment configuration information comprises at least one of the following: a chain name of a root chain, a configuration file directory, a data storage directory, a log file directory, a certificate file directory, a node address file directory, an engine configuration file name, a log configuration file name, a service configuration file name, a blockchain ledger storage directory, a network configuration file name, or a ledger configuration file name.

8. The method of claim 6, wherein
component configuration information of a consensus component comprises a consensus component type and consensus algorithm configuration information;
component configuration information of a ledger component comprises a storage engine and a data storage manner;
component configuration information of a contract component comprises contract virtual machine configuration information and a contract upgrade switch; and
component configuration information of a network component comprises a network component name, a node address, a node key address, and a seed node address.

9. The method of claim 6, wherein before instantiating the at least one kernel component according to the component configuration information in the operation configuration information, the method further comprises:
loading blockchain data on which the blockchain system is based according to a blockchain data storage address in the operation configuration information.

10. The method of claim 2, wherein starting up and operating the kernel engine and the main program of the blockchain system comprises:
starting up and operating the main program of the blockchain system, and starting up and operating, in a process of operating the main program of the blockchain system, the kernel engine through the startup interface of the kernel engine;
in a process of operating the kernel engine, instantiating a communication network by calling a network component which acts as the at least one kernel component, and starting monitoring a communication network port to receive a processing request transmitted through the communication network; and
in the process of operating the kernel engine, determining a current miner node by calling a consensus component which acts as the at least one kernel component.

11. The method of claim 2, wherein starting up the port monitoring service comprising:
loading port configuration information; and
instantiating, according to the port configuration information, a remote procedure call service and starting up the remote procedure call service to monitor a remote procedure call port, wherein the remote procedure call port is configured to obtain a processing request initiated by a client.

12. An electronic device, comprising: at least one processor; and a memory communicatively connected to the at least one processor; wherein the memory is configured to store an instruction executable by the at least one processor to cause the at least one processor to perform: operating a main program of a blockchain system to initialize a kernel engine and at least one kernel component, wherein the main program of the blockchain system comprises an initialization method of the kernel engine and an initialization method of the at least one kernel component; obtaining operation configuration information of the blockchain system through a program configuration file to instantiate the kernel engine and the at least one kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, wherein the port monitoring service refers to a service in which an application layer interaction port for interacting between the kernel engine and an application layer is monitored, and the kernel engine is configured to call, in a process of processing blockchain data, the at least one kernel component based on a kernel component interface; wherein operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and wherein operating the main program of the blockchain system to initialize the at least one kernel component comprises: operating an initialization method of the at least one kernel component in the main program of the blockchain system; and in a process of operating the initialization method of the at least one kernel component, calling an adapter registration interface in a kernel framework to register a component driver of the at least one kernel component in a component adapter.

13. The electronic device of claim 12, wherein the main program of the blockchain system comprises a startup interface of the kernel engine, and an exit interface of the kernel engine.

14. The electronic device of claim 13, wherein the kernel engine is configured to, in the process of processing the blockchain data, initiate a kernel component call request based on the kernel component interface provided by a component adapter and call the at least one kernel component through a kernel instruction interface registered in the component adapter.

15. The electronic device of claim 13, wherein the main program of the blockchain system is configured to execute an application layer business function in the blockchain system; the kernel engine is configured to execute a blockchain kernel process; and the at least one kernel component is configured to execute a set component function in a blockchain operation process.

16. The electronic device of claim 15, wherein
the kernel process comprises at least one of the following: a transaction submission process, a block verification process, a block synchronization process, or a blockchain system management function; and
the at least one kernel component comprises at least one of the following: a consensus component, a network component, a ledger component, a contract component, a permission component, or an encryption component.

17. The electronic device of claim 12, wherein obtaining the operation configuration information of the blockchain system through the program configuration file to instantiate the kernel engine and the at least one kernel component comprises:
calling, through the main program of the blockchain system, an engine creation interface of an engine factory and inputting a blockchain engine identifier and the operation configuration information of the blockchain system;
determining, through the engine factory, a corresponding instantiation function pointer according to the blockchain engine identifier;
obtaining, through the engine factory, a kernel engine code according to the instantiation function pointer, and performing kernel engine instantiation on the kernel engine code according to environment configuration information in the operation configuration information; and
instantiating the at least one kernel component according to component configuration information in the operation configuration information.

18. The electronic device of claim 17, wherein the environment configuration information comprises at least one of the following: a chain name of a root chain, a configuration file directory, a data storage directory, a log file directory, a certificate file directory, a node address file directory, an engine configuration file name, a log configuration file name, a service configuration file name, a blockchain ledger storage directory, a network configuration file name, or a ledger configuration file name.

19. The electronic device of claim 17, wherein
component configuration information of a consensus component comprises a consensus component type and consensus algorithm configuration information;
component configuration information of a ledger component comprises a storage engine and a data storage manner;
component configuration information of a contract component comprises contract virtual machine configuration information and a contract upgrade switch; and
component configuration information of a network component comprises a network component name, a node address, a node key address, and a seed node address.

20. A non-transitory computer-readable storage medium storing a computer instruction, wherein the computer instruction is configured to cause a computer to perform: operating a main program of a blockchain system to initialize a kernel engine and at least one kernel component, wherein the main program of the blockchain system comprises an initialization method of the kernel engine and an initialization method of the at least one kernel component; obtaining operation configuration information of the blockchain system through a program configuration file to instantiate the kernel engine and the at least one kernel component, wherein the operation configuration information of the blockchain system comprises specification selection information of the kernel engine and specification selection information of the at least one kernel component; starting up and operating the kernel engine and the main program of the blockchain system; and starting up a port monitoring service to operate the blockchain system, wherein the port monitoring service refers to a service in which an application layer interaction port for interacting between the kernel engine and an application layer is monitored, and the kernel engine is configured to call, in a process of processing blockchain data, the at least one kernel component based on a kernel component interface; wherein operating the main program of the blockchain system to initialize the kernel engine comprises: operating the initialization method of the kernel engine in the main program of the blockchain system; and in a process of operating the initialization method of the kernel engine, calling an engine registration interface of an engine factory in a kernel framework, inputting a blockchain engine identifier and an instantiation function pointer of the kernel engine, and recording the blockchain engine identifier and the instantiation function pointer of the kernel engine through the engine factory; and wherein operating the main program of the blockchain system to initialize the at least one kernel component comprises: operating an initialization method of the at least one kernel component in the main program of the blockchain system; and in a process of operating the initialization method of the at least one kernel component, calling an adapter registration interface in a kernel framework to register a component driver of the at least one kernel component in a component adapter.

* * * * *